Figure 1:
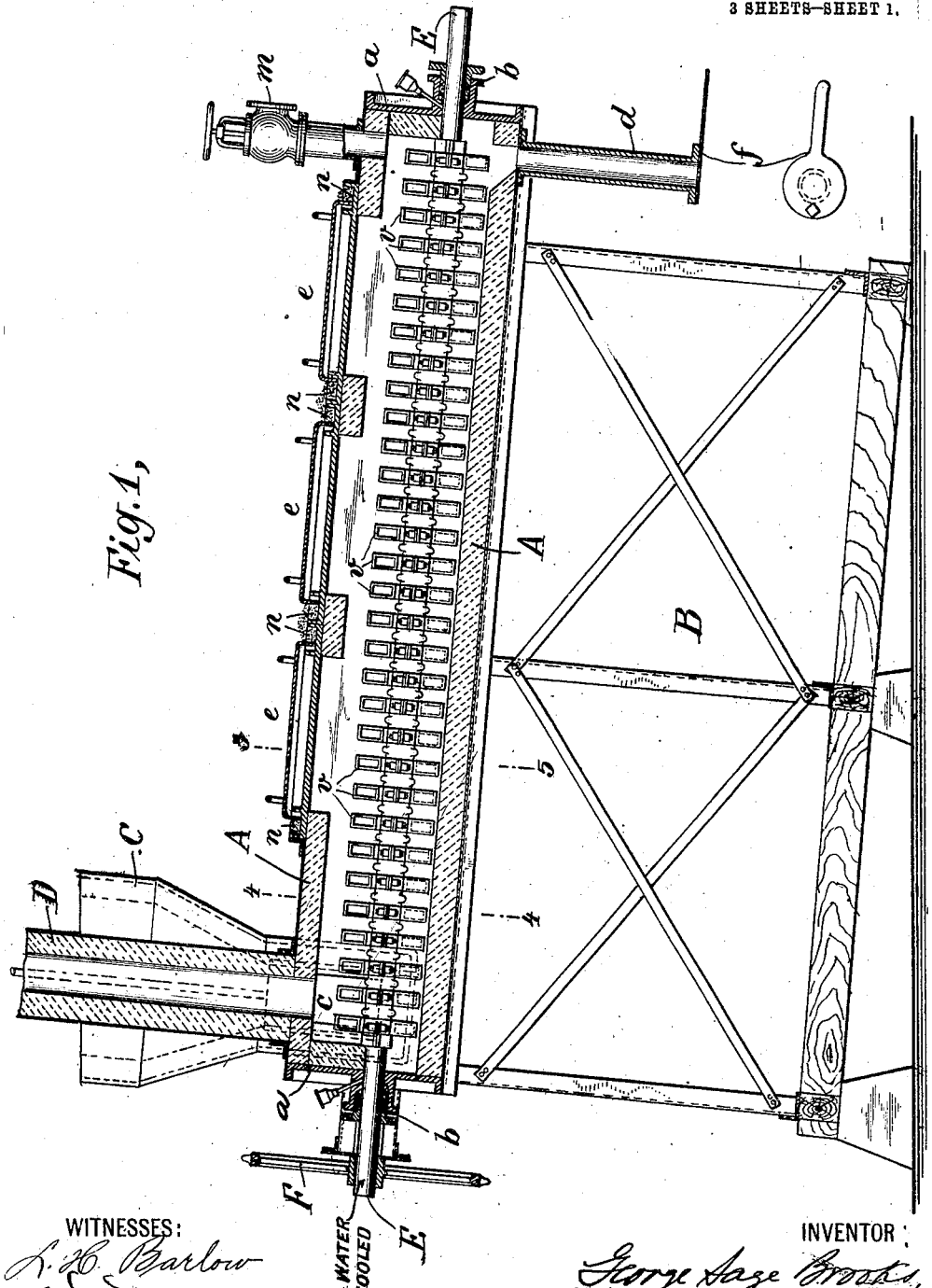

G. S. BROOKS.
APPARATUS FOR MAGNETIZING DESULFURIZED ORES.
APPLICATION FILED JULY 17, 1909.

1,090,516.

Patented Mar. 17, 1914.
3 SHEETS—SHEET 1.

WITNESSES:

INVENTOR
George Sage Brooks,
BY
ATTORNEY

G. S. BROOKS.
APPARATUS FOR MAGNETIZING DESULFURIZED ORES.
APPLICATION FILED JULY 17, 1909.
1,090,516.
Patented Mar. 17, 1914.
3 SHEETS—SHEET 2.
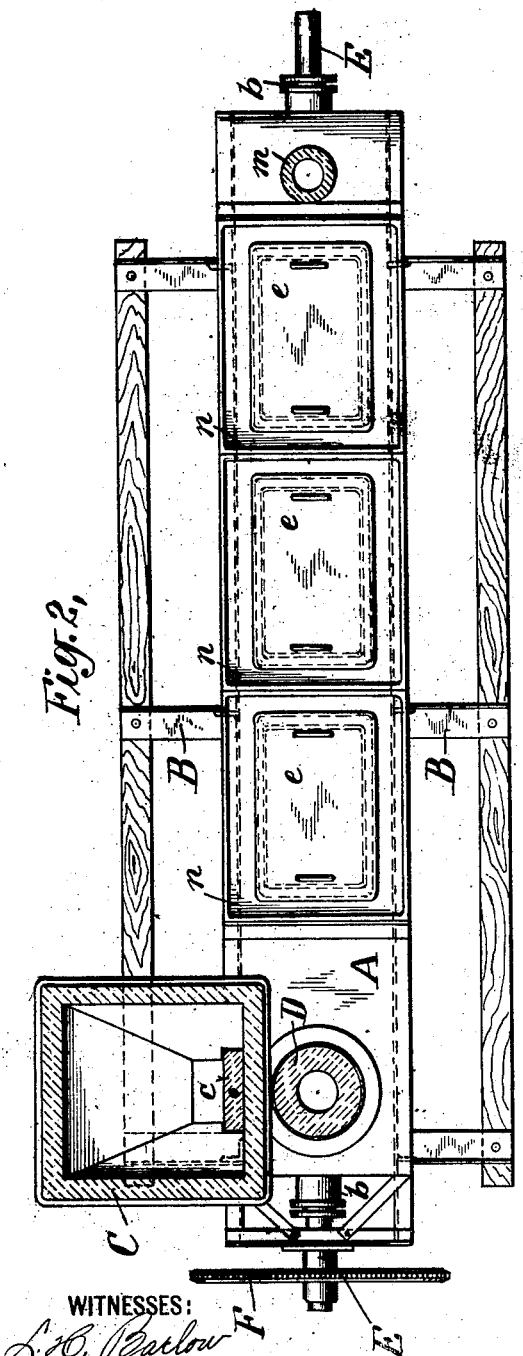
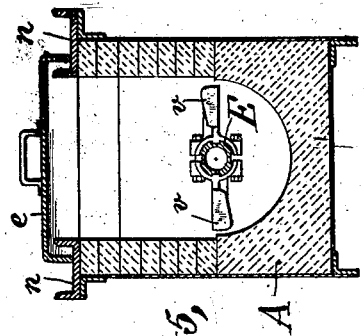
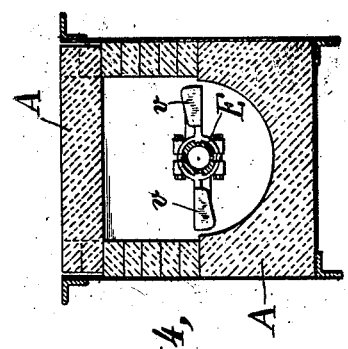

G. S. BROOKS.
APPARATUS FOR MAGNETIZING DESULFURIZED ORES.
APPLICATION FILED JULY 17, 1909.
1,090,516.
Patented Mar. 17, 1914.
3 SHEETS—SHEET 3.
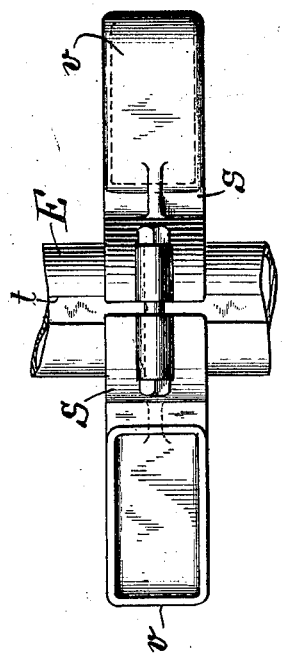
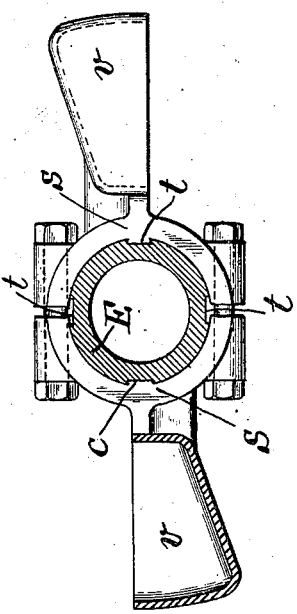
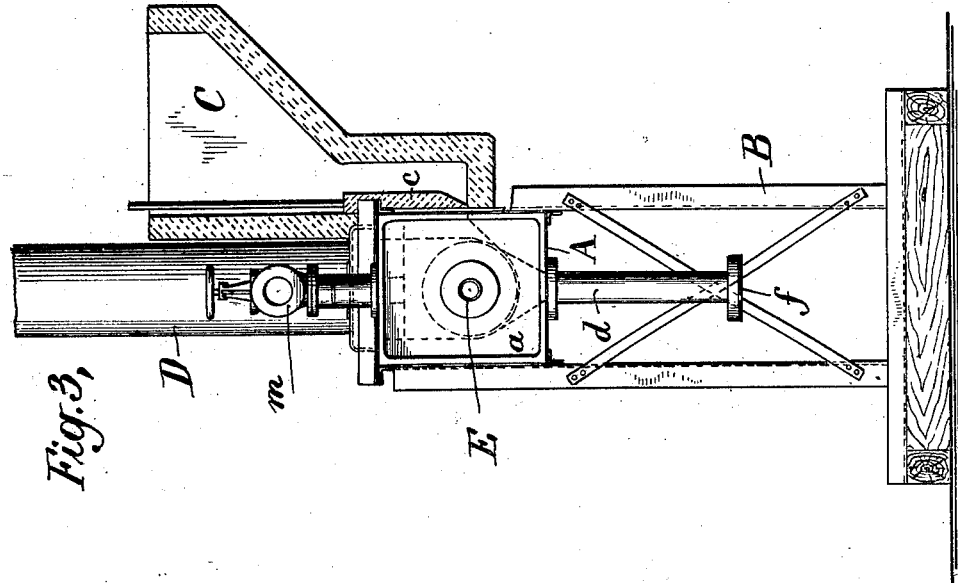

UNITED STATES PATENT OFFICE.

GEORGE SAGE BROOKS, OF DEPUE, ILLINOIS, ASSIGNOR TO MINERAL POINT ZINC COMPANY, OF DEPUE, ILLINOIS, A CORPORATION OF NEW JERSEY.

APPARATUS FOR MAGNETIZING DESULFURIZED ORES.

1,090,516. Specification of Letters Patent. Patented Mar. 17, 1914.

Application filed July 17, 1909. Serial No. 508,171.

*To all whom it may concern:*

Be it known that I, GEORGE SAGE BROOKS, a citizen of the United States, residing at Depue, in the county of Bureau and State of Illinois, have invented certain new and useful Improvements in Apparatus for Magnetizing Desulfurized Ores; and I do hereby declare the following to be a full, clear, and exact description of the invention, such as will enable others skilled in the art to which it appertains to make and use the same.

In an application for Letters Patent of the United States, of even date herewith Ser. No. 508172, I have described a method, of my invention, for effectively separating, by low intensity magnets, ores originally consisting of mixed iron sulfid (pyrite or marcasite) and zinc sulfid (zinc blende), and, at the same time, recovering, in utilizable form, the sulfur and iron byproducts.

The present invention relates to a form of apparatus devised by me for carrying out the main portion of the method, to wit, the conversion of the iron ore constituent of the mixed ore, after the ore has been subjected to a dead roast, into magnetic iron oxid, thereby increasing the magnetic gap between the iron ore constituent and the iron-carrying zinc ore constituent of the roasted ore to such an extent that the converted iron ore particles may be readily lifted and withdrawn by magnets of an intensity quite insufficient to affect the zinc ore particles.

In the accompanying drawings, Figure 1 represents a vertical longitudinal section and partial elevation of my said preferred form of apparatus for subjecting the dead-roasted ore to the action of a reducing gas; Fig. 2 represents a top plan view thereof, partly in section; Fig. 3 represents an end elevation, partly in section; Figs. 4 and 5 represent vertical cross sections, taken respectively on planes indicated by the lines 4—4 and 5—5 of Fig. 1. Figs. 6 and 7 represent detail views of one of the lifting cups or pockets employed for lifting and dropping the desulfurized ore as it progresses through the apparatus.

Referring to the drawings, A indicates a long trough-like or U-shaped chamber, mounted upon a supporting frame work, B, which gives it a suitable slope or inclination in the direction of its length. The chamber is lined with fire-brick or the like, inclosed in an outer metallic shell, and is provided with end caps $a$, having stuffing boxes $b$, packed with asbestos rope and plumbago or similar material, through which extends the rotary shaft E, preferably made hollow, so as to be protected by the cooling action of a current of water passing through it.

At one end, the chamber A is provided with a side opening having a vertically slidable gate $c$, located within the feed hopper C the adjustment of the gate corresponding to the desired feed of the desulfurized ore to the chamber. The gate and feed hopper are also of refractory material, so as to withstand the heat of the hot desulfurized ore taken directly from the roaster and the opening from the hopper into the chamber A is kept sealed by the ore during the operation.

The chamber A is provided with explosion doors $e$, resting loosely at their edges upon flanged rims $n$ having sand seals, as shown. These doors are provided as safety devices in case of emergency, such as the accidental leakage of air into the chamber in quantity sufficient to create an explosive mixture, but under normal conditions of operation this will not take place, inasmuch as the reducing gas sent into the chamber will be maintained therein under such pressure that there will be no tendency for air to enter the chamber.

At its delivery end, the chamber A is provided with a discharge pipe $d$, closed by the movable slide $f$, from which pipe the magnetized ore is drawn periodically, when it has accumulated therein in sufficient quantity from its continuous source of supply.

The reducing gas (preferably hot producer gas, direct from the producer) is admitted at one end of the chamber A through the brick-lined flue D, and the waste gaseous products are allowed to escape at the opposite end through a closely-regulated valve in the gas-outlet pipe m.

The movement of the roasted ore through the chamber is made possible by the slope of its bottom, along which it gradually passes, when lifted and dropped by the slowly revolving cups or pockets v shown in detail in Figs. 6 and 7. These cups or pockets are mounted along side of each other, from end to end of the shaft E, and are for lifting the ore, and are provided with semi-cylindrical hub portions s, having keys t cast thereon and which engage key ways on the shaft. The cups are removably and adjustably locked to the shaft by means of the clamping bolts and nuts shown.

In practising the method set forth in my co-pending application hereinbefore referred to, the ore, containing the mixed iron sulfid and zinc blende to be separated, is first subjected to a preliminary dead roast in any suitable furnace, thereby permitting the $SO_2$ from the roasting furnace to be utilized as a source of commercial production of sulfuric acid (for instance, by the contact process).

Care is to be taken in the dead-roasting of the ore to avoid, as far as possible, any substantial fusing or sintering together of the material, so that it may be withdrawn from the roasting furnace in a fairly granular and porous condition. While still retaining the heat, or substantially the heat, of the roasting operation, the desulfurized ore is then admitted, through the feed hopper C and gate c, into the chamber A, wherein the shaft E and its revolving cups receive a slow movement of rotation through the intermediacy of the driving sprocket F fixed upon the shaft and actuated, from any suitable source of power, at a rate that may be varied according to circumstances, from, say, forty minutes to three hours, as determined by tests of the product of the operation. In the meantime, hot producer gas is admitted through the flue D, under such pressure as will exclude the entrance of air into the chamber A. The producer gas passes through the ore, lifted and dropped into the gas current by the revolving cups, and is thus brought into intimate contact with it, the waste gaseous products issuing through the closely-regulated gas exit pipe m. The chief reaction of the producer gas upon the ore may be expressed by the formula

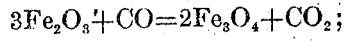

that is, the carbon monoxid present in the producer gas converts the ferric oxid of the desulfurized ore into magnetic oxid of iron. As commercial producer gas usually contains some proportion of hydrogen, the latter may also aid in the reducing action. The reduction and magnetization proceeds most favorably, at or about a low red heat,—say from 400° C. to 650° C.

Of the iron present in the zinc blende constituent of the ore, a large per cent. is magnetic after the dead roasting operation. Therefore, the more magnetic the iron ore constituent can be made in the chamber A, the greater will be the gap between the magnetic attractability or permeability of the iron ore particles, and the particles of roasted blende with their small amount of magnetic iron, and the cleaner and sharper will be the subsequent magnetic separation. This gap I bring approximately to the attainable maximum, with the result that after the ore has passed through the chamber A, into the discharge pipe d, (from which it is removed periodically as required) it may be passed over or otherwise subjected to the separating action of a magnetic separator of the usual low or moderate magnetic field intensity, and a commercially complete separation obtained of the roasted and magnetized iron ore from the roasted iron-carrying blende.

Having thus described my invention, what I claim is:—

1. Apparatus for increasing the magnetic gap between the iron ore constitutent and the zinc ore constituent of dead roasted mixed sulfid ore, consisting of a chamber having refractory walls, a feed hopper for supplying the roasted ore to one end of said chamber, means for progressing the ore through the chamber and for lifting and dropping it during its progress, a gas inlet flue for supplying a reducing gas to the chamber, and exit passages for the waste gases and for the reduced ore product, said chamber being further provided with explosion doors resting in sand seals and constituting a part of the top wall or cover of the chamber; substantially as described.

2. Apparatus for increasing the magnetic gap between the iron ore constituent and the zinc ore constituent of dead roasted mixed sulfid ore, consisting of a chamber whose interior is substantially U-shaped in cross section and having refractory walls, a supporting frame arranged to give a longitudinal inclination to the chamber, a feed hopper for supplying the roasted ore to said chamber at its upper portion through an opening in one of its sides, a regulating gate for said opening, stuffing boxes at the ends of the chamber, a rotatory shaft passing through the stuffing boxes, lifting cups mounted upon the shaft and operating along the curved bottom of the U-shaped chamber, explosion doors forming a portion of the top wall or cover of the chamber, a gas inlet flue for supplying a reducing gas to the chamber, and exit passages for the waste gases and for the reduced ore product; substantially as described.

3. In apparatus for the purposes described, the combination with the inclined reducing chamber of means for lifting and dropping ore, consisting of a rotatory shaft having mounted thereon a series of cups or pockets provided with sectional hub portions with keys cast therein engaging corresponding key-ways on the shaft, and clamping bolts and nuts for removably locking the cups to the shaft; substantially as described.

In testimony whereof I affix my signature, in presence of two witnesses.

GEORGE SAGE BROOKS.

Witnesses:
HENRY A. KRETSCH,
J. A. GURNETT.